United States Patent [19]

McKelvey

[11] Patent Number: 4,501,498
[45] Date of Patent: Feb. 26, 1985

[54] METHOD AND APPARATUS FOR EXTRUDING THERMOPLASTIC MATERIAL

[75] Inventor: James M. McKelvey, St. Louis, Mo.

[73] Assignee: Luwa Corporation, Charlotte, N.C.

[21] Appl. No.: 558,042

[22] Filed: Dec. 5, 1983

[51] Int. Cl.³ .............................................. B29B 1/04
[52] U.S. Cl. ...................................... 366/69; 366/79; 366/145; 366/339; 425/204; 425/207
[58] Field of Search ............... 366/69, 77, 79, 80, 366/81, 87, 91, 147, 144, 145, 146, 149, 151, 131, 132, 133, 339; 425/204, 207, 144, 149

[56] References Cited

U.S. PATENT DOCUMENTS

| | | |
|---|---|---|
| 2,722,716 | 11/1955 | Henning . |
| 2,883,163 | 4/1959 | Solheim . |
| 3,007,198 | 11/1961 | Colwell et al. . |
| 3,055,053 | 9/1962 | Livingston et al. . |
| 3,310,836 | 3/1967 | Nichols . |
| 3,442,065 | 5/1969 | Foras . |
| 3,649,147 | 3/1972 | Fritsch ................................ 425/207 |
| 3,711,067 | 1/1973 | Kovacs ................................ 425/207 |
| 3,817,675 | 6/1974 | Maiocco ............................. 425/207 |
| 3,991,153 | 11/1976 | Klausner ............................. 425/208 |
| 4,032,391 | 6/1977 | Moked et al. . |
| 4,094,946 | 6/1978 | Finkensiep ......................... 425/208 |
| 4,137,023 | 1/1979 | Moked et al. . |
| 4,306,848 | 12/1981 | Nunn ................................. 425/208 |
| 4,367,190 | 1/1983 | Beach . |

FOREIGN PATENT DOCUMENTS

13406 7/1980 European Pat. Off. .

Primary Examiner—Robert W. Jenkins
Attorney, Agent, or Firm—Richards, Shefte & Pinckney

[57] ABSTRACT

A gear pump assisted screw conveyor extrusion system utilizing a cartridge heating device disposed axially within the screw and having the drives for the gear pump and the screw correlated in speed to create relatively little pressure in the thermoplastic material being extruded such that relatively little mechanical working thereof occurs. The thermoplastic material is melted in the screw conveyor primarily by heat transfer from the cartridge heater and the gear pump is utilized for conveying the melted material under pressure to a subsequent work station. A relatively deep material-conveying spiral channel is provided in the screw for maximized extrusion output per revolution of the screw and minimized mechanical energy generation by the screw. A motionless mixer may be employed intermediate the screw and the work station to homogenize the melted material for reducing temperature gradients therein. The system advantageously is capable of extruding material at a substantially greater rate and a lower material temperature and with substantially increased power economy than conventional systems utilizing a high pressure, externally heated screw conveyor portion.

24 Claims, 11 Drawing Figures

METHOD AND APPARATUS FOR EXTRUDING THERMOPLASTIC MATERIAL

BACKGROUND OF THE INVENTION

Many various forms of thermoplastic polymeric material are conventionally extruded into a wide variety of products including sheets, film, rods, tubes, strands, as well as many others. Basically, the extrusion process requires the melting of the thermoplastic material employed, and sufficient pressurization of the melted material to cause it to flow, at the desired rate, through an appropriate die to form the intended end product. Pressures in the range of 2000 to 5000 pounds per square inch (psi) in the melted material at the dieface typically are required. An important determinant of the quality of the end product is how well its dimensions conform to specification. Usually, end product quality decreases as the extrusion rate increases, and over the years, an ongoing problem has existed in the industry in striking an acceptable balance between an economical rate of extrusion and an acceptable quality of the extruded product.

For many years, conventional apparatus for extruding thermoplastic material generally as included a cylindrical barrel in which is rotatably disposed a conveying screw. The thermoplastic material is fed in a solid pellet or powder form into the barrel at one end and conveyed to the other end of the barrel by rotation of the screw. The heat required to transform the thermoplastic material from a solid at room temperature to a molten material at the desired extrudate temperature is derived from two sources. First, heating elements affixed to the extruder barrel generate heat which flows by conduction and convection into the thermoplastic material. Second, the motion of the thermoplastic material through the screw channel generates frictional heat. This friction heat is derived ultimately from the mechanical drive system of the extruding apparatus and is often referred to as mechanical heating.

The rate at which mechanical heating is generated in conventional extruding apparatus increases rapidly with increasing screw speed. In most extrusion processes, relatively high screw speeds, typically in excess of 100 rpm, are used to obtain economical production rates, and this results in frictionally generated heat being the dominant source of energy. Hence with increasing screw speed, and increasing extrusion rates, extrudate temperature rises often above a desirable level. Thus, in many extrusion processes, mechanical heat generation and extrudate temperature limits the speed and hence the productive capacity of the extruding apparatus. In order to operate at high screw speeds, many extruding apparatus perform cooling of the extruder barrel to remove the excess heat energy from the thermoplastic material. However, the heat removed by such cooling is waste heat thus making the process energy inefficient.

Conventionally, the extruder screw is constructed to define a helical channel of a decreasing cross-sectional areas whereby, in steady operation, the forces generated by the rotation of the extruder screw to force the thermoplastic material through the channel generate hydrostatic pressure in the thermoplastic material. This pressure causes the forward flow of the material to be diminished, an effect often attributed to and called "backflow", which has conventionally been considered advantageous in insuring complete melting and homogeneity of the melted thermoplastic material.

Conventional extruding apparatus is widely recognized to have several disadvantageous limitations. First and most notably, the rate of extrusion and the extrudate temperature uniformity and quality are inversely related to one another, which substantially limits the maximum extrusion rate at which an acceptably uniform product can be extruded and therefore correspondingly limits the productivity of such apparatus. The term "extrudate quality" generally refers to the uniformity of the temperature, pressure and composition of the extrudate at the dieface. If the extrudate is of low quality, temperature and pressure fluctuations are large and the flow of the thermoplastic material through the die will be irregular and unsteady and the quality of the product will be degraded. Frequently, in an attempt to achieve greater production rates with low quality extrudate, conventional extruding apparatus may be operated to produce a product having a greater than desirable average thickness in order to meet minimum thickness specifications. Secondly, as aforementioned, a substantial portion, usually 75-100% and often more, of the heat required in conventional extruding apparatus for melting the thermoplastic material is generated by mechanical heating. Hence, conventional extruding apparatus require powerful drive systems and operate with relatively low values of "power economy", defined as the ratio of the extrusion rate to the mechanical power expended. Typically, power economy is in the range of 5 to 10 pounds per horsepower-hour (lbs/HP-hr) in conventional extruding apparatus. Thirdly, as aforementioned, many conventional extruding apparatus are relatively energy inefficient as a consequence of their generation of waste excessive heat in the extrudate due to high screw speeds conventionally employed and the accompanying necessity of removing the excess heat energy by cooling.

In recent years, considerable interest has developed in the utilization of gear pumps, sometimes referred to as melt pumps, in combination with a conventional above-described screw extruder intermediate it and the die as a means of overcoming at least partially the described disadvantages of conventional extruders, a representative example of which is disclosed in U.S. Pat. No. 4,350,657. As will be understood, a gear pump is essentially a positive displacement device and therefore its volumetric output is a function of the pump speed and is substantially unaffected by pressure surges and fluctuations in the input flow from the extruder. Accordingly, the use of a gear pump will make more uniform the volumetric flow of melted thermoplastic material through the die of the extruding apparatus. However, experience has shown that passage through a gear pump will not significantly reduce temperature variations in the polymer melt. Hence a gear pump can only insure that the volumetric flow rate of the extrudate is uniform and if the extrudate has large temperature variations in it, these will pass through the pump and appear at the die, where they can cause irregular flow and degrade product quality. Experience has also shown that a combined extruder-gear pump system does not necessarily result in increased power economy, or reduced extrudate temperatures and that the overall energy efficiency of a pump-extruder system may actually in some cases be lower than that of the extruding apparatus itself. As the state of the art of combined systems of extruders and gear pumps has developed, it has remained conventional practice to operate the screw extruder under conditions comparable to conventional extruders alone with relatively high screw speeds and with mechanical heat generation predominating, as is represented in the aforementioned U.S. Pat. No. 4,350,657.

SUMMARY OF THE INVENTION

In contrast, the present invention provides an improved method of operation and construction of a combined system of a screw extruder and gear pump by which substantial and unexpected increases in the rate of extrusion, the power economy and the energy efficiency of the screw extruder, and in turn of the overall system, and improved control of the temperature level of the material are realized by arranging the extruder and the gear pump to operate at selected compatible speeds to create relatively little pressurization of the thermoplastic material in the extruder at its discharge end for relatively little heat generating mechanical working thereof in comparison to conventional extruders and by providing a heater within the extruder screw for melting the thermoplastic material in the extruder primarily by thermal heat transfer by conduction from the screw rather than by mechanical heating. The gear pump is employed to convey the melted thermoplastic material under pressure to a subsequent working station, e.g., an appropriate selected die, thus removing the necessity for the screw to discharge the melted material at a relatively high pressure.

In this manner, relatively little backflow of the material occurs in the extruder in contrast to conventional extruders. As desired, conventional exterior barrel heaters may be employed with the extruder but with the screw heater predominately supplying the requisite thermal heating of the thermoplastic material and the exterior heaters only secondarily and supplementally heating the material. In the preferred embodiment, the melted thermoplastic material discharged from the screw is blended either before entering or after discharge from the gear pump to be more homogeneous with lower temperature gradients, the blending preferably being accomplished by passing the melted material through a motionless mixing device. In this manner, a higher extrudate quality is achieved other than through the conventional backflow effect in conventional apparatus. It is also preferred that a barrel heater be provided about the motionless mixing device for supplementarily heating the melted material to a predetermined temperature level for extrusion at the die or other subsequent working.

The extruder screw preferably has a relatively low length to diameter ratio in the range of 12:1 to 20:1 and a relatively small compression ratio in the range of 1:1 to 2:1 for maximized extrusion output per revolution of the screw and minimized dissipation to the extrudate of the mechanical energy generated by the screw. In one preferred form, the spiral screw flight of the screw is of a decreasing radially outward dimension along the length of the screw in the direction of material conveyance, the flight preferably being of a radial dimension at the inlet end of the extruder of approximately 40-50 percent of the overall radial dimension of the screw and decreasing to approximately 15-20 percent thereof at the extrusion end of the extruder. In another preferred form, the screw flight is of a constant radial dimension but a decreasing spiral helix angle along the length of the screw. The internal heater of the screw is preferably an electrically-operated cartridge heater. As desired, plural motionless mixing devices may be employed in parallel for enhancing the blending operation.

DESCRIPTION OF THE PREFERRED EMBODIMENT

Figure 1:
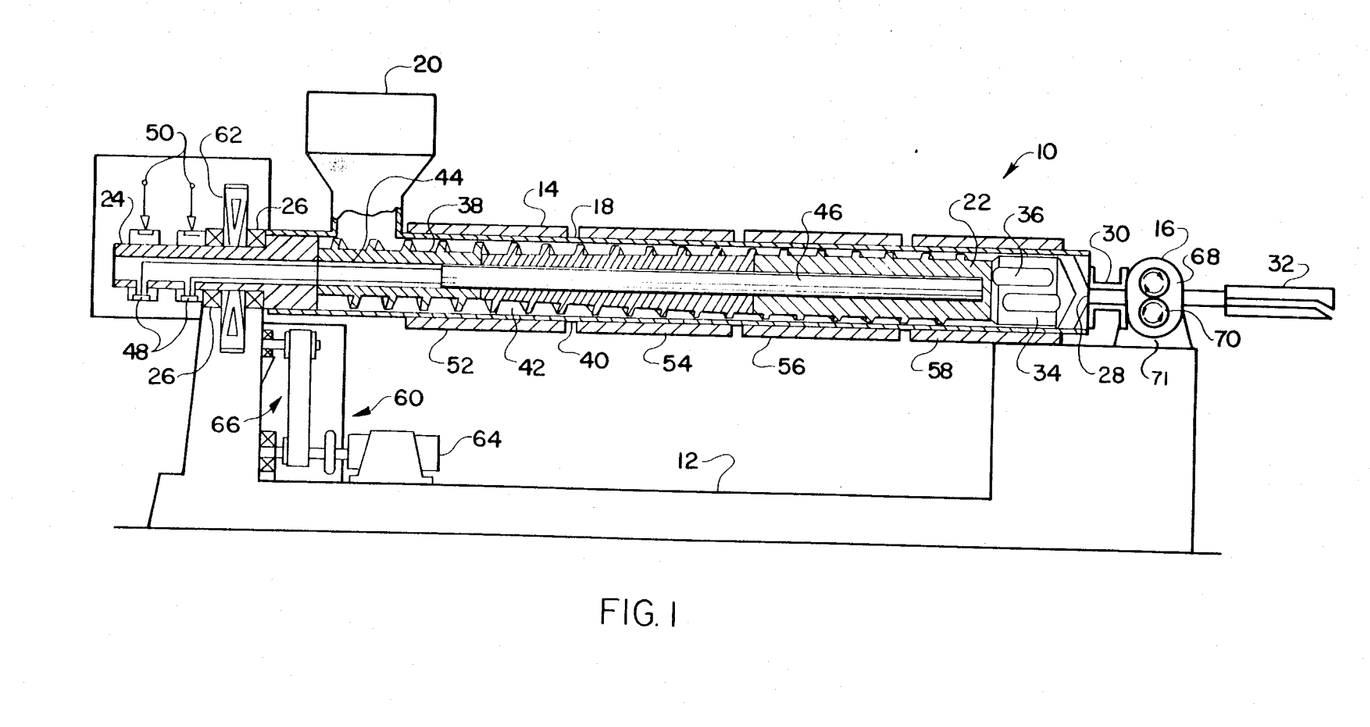
FIG. 1 is a schematic vertical sectional view of a combined system of a screw extruder and a gear pump according to the preferred embodiment of the present invention.

Referring now to the accompanying drawings, and initially to FIG. 1, an extruder system according to the preferred embodiment of the present invention is schematically illustrated and indicated generally at 10. The extruder system 10 basically includes a supporting framework 12 on which are mounted in feeding series a longitudinal screw conveyor assembly 14 and a gear pump 16. The screw conveyor assembly 14 includes a cylindrical housing or barrel 18 affixed at its ends to the frame 12 in a substantially horizontal disposition. The intake end of the screw barrel 18 distal to the gear pump 16 is provided with a feed hopper 20 opening thereinto for supplying thermoplastic working material to the system 10. The screw conveyor assembly 14 includes a longitudinal threaded screw member 22 extending longitudinally through substantially the entire length of the barrel 18. The discharge end of the screw barrel 18 has a central discharge opening 28 which communicates with the intake side of the gear pump 16 through an adaptor spool 30. The discharge side of the gear pump 16 communicates with a material forming die 32.

The screw member 22 basically includes a shank portion 24 at one end thereof by which the screw member 22 is rotatably journaled in thrust bearings 26 in the supporting frame 12 at the intake end of the screw conveyor assembly 14. A mixing head 34 is provided at the other end of the screw member 22 and is of a diameter only slightly less than the internal diameter of the barrel 18 to function in part as a bearing member for rotatably supporting the screw member 22 in conjunction with the shank portion 24. Axial slots or flutes 36 are formed in the periphery of the mixing head 34 for material passage therethrough. The screw member 22 further includes a circular root portion 38 of a reduced diameter extending axially between the shank portion 24 and the mixing head 34, from which root portion 38 outwardly extends a single-flight spiral screw thread 40 for the entire length thereof to form a spiral material-conveying peripheral channel 42.

According to the present invention, the screw member 22 preferably is constructed of a relatively low length to diameter ratio and a relatively small compression ratio as compared to the screw members of conventional screw extruder systems, thereby to maximize the rate of material conveyance by the screw member 22 per revolution thereof and to minimize the dissipation of the mechanical rotational energy of the screw member 22 therefrom to the material conveyed. Thus, it is preferred that the length to diameter ratio of the screw member 22 be on the order of 12:1 to 20:1 as compared to 24:1 to 30:1 conventionally. As will be understood, the preferred length to diameter ratio of the screw member may vary according to the particular material to be extruded. However, in all cases, it is preferable that such ratio be as low as possible to reduce the mechanical power requirements for operation of the screw member and thereby to improve the mechanical power economy of the system. For example, in a preferred screw extruder assembly 14 for use in the present invention for extruding a linear low density polyethylene, the diameter of the screw member 22 is 2.5 inches and the length of the threaded portion of the screw member 22 is 40.0 inches, given ordinary manufacturing tolerances, thereby providing a length to diameter ratio of 16:1.

The preferred compression ratio of the screw member 22 is between a minimum of approximately 1:1 and a maximum of approximately 2:1, as compared to the compression ratios of conventional screw members which range between 2:1 and 5:1. As used herein, the term "compression ratio" has its ordinary meaning as used and understood in the extruding art and may be defined as the ratio of the cross-sectional area of the channel of the screw member at its feed, or entrance, end to the cross-sectional area of the channel of the screw member at its discharge end. According to the present invention, the cross-sectional area of the screw member 22 is greater than that of corresponding conventional screw members by a factor of at least two (2), thus giving the screw member 22 a greater output per screw revolution than conventional. It is to be noted that the required decrease in the cross-sectional area of the screw member can be achieved either by reducing the depth of the screw channel from the entrance to discharge ends thereof or by reducing the helix angle of the screw flight from the entrance to discharge ends thereof or a combination of both.

Figure 2:
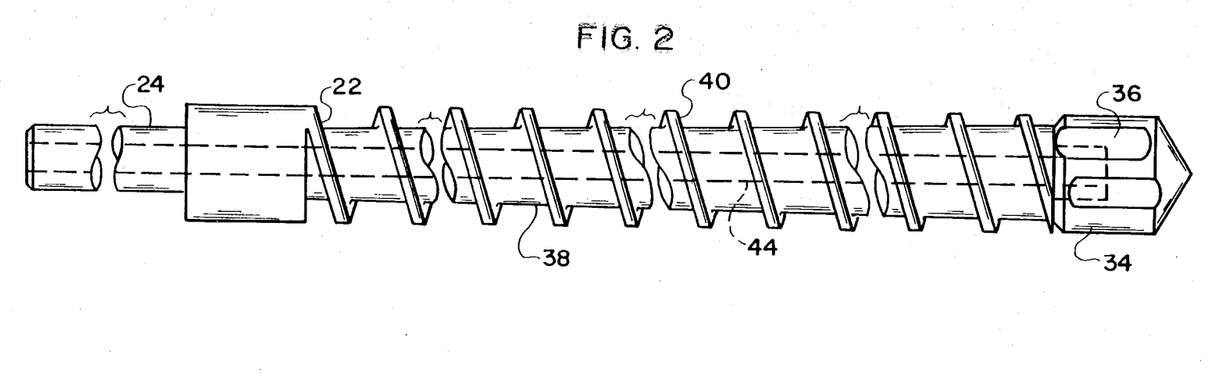
FIG. 2 is a side elevational view of one form of an extruder screw utilized in the system of FIG. 1.
Figure 3:
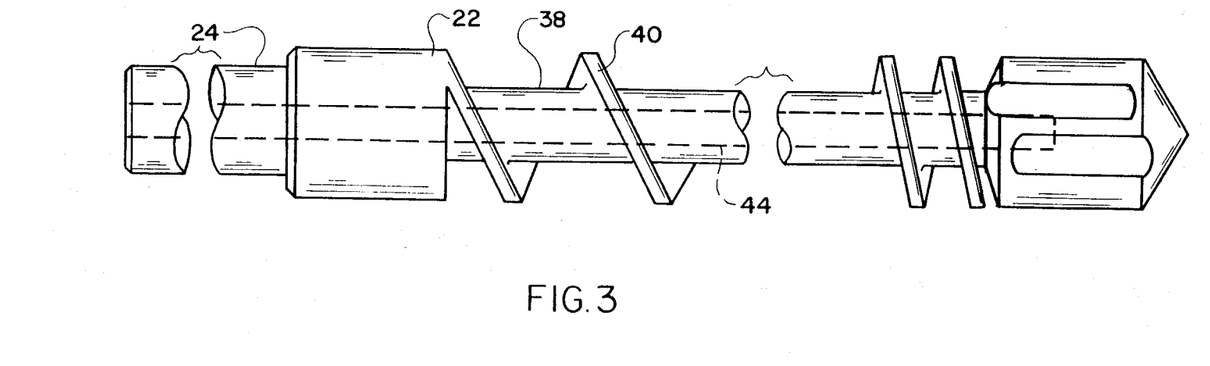
FIG. 3 is a side elevational view of another form of an extruder screw utilized in the system of FIG. 1.

By way of example, two particular forms of construction of the screw member 22 embodying the above-discussed features are respectively illustrated in FIGS. 2 and 3. In the embodiment of the screw member 22 illustrated in FIG. 2, the root portion 38 is of a relatively small constant diameter for a portion of its length at the intake end, is of a relatively large constant diameter for a portion of its length at the discharge end, and is of a tapering diameter for the intermediate portion of its length therebetween. The helix angle of the spiral thread 40 is constant along the entire length of the screw member 22. In this manner, the intake portion of the length of the screw member 22 forms a feeding section primarily for conveying movement of the process material, the discharge portion of the length of the screw member 22 forms a metering section primarily for discharging the process material at a generally uniform flow rate, and the tapered intermediate portion of the length of the screw member 22 forms a transition section between the feed and metering sections. For example, in a relatively small diameter embodiment of this screw member construction, e.g. 2.5 inches in diameter, the root portion 38 in the feed section of the screw member 22 is preferably of a radius approximately only 50 to 60 percent of the overall radial dimension of the screw member 22, e.g. 0.75 inches, whereby the depth of the channel 42 in the feed section is approximately 40 to 50 percent of the overall radial dimension of the screw member 22, e.g. 0.5 inches. The root portion 38 in the metering section of the screw member 22 is preferably of a radius approximately 80 to 85 percent of the overall radial dimension of the screw member 22, e.g. 1.05 inches, whereby the depth of the channel 42 in the metering section is approximately 15 to 20 percent of the overall radial dimension of the screw member 22, e.g. 0.2 inches.

In the second embodiment of the screw member 22 of the present invention as illustrated in FIG. 3, the root portion 38 of the screw member 22 is of a constant diameter for its entire length, with the helix angle of the spiral thread 40 progressively decreasing along the length of the screw member 22 from its intake to its discharge ends. In a small diameter embodiment of this screw member construction, e.g. 2.5 inches diameter, the radius of the root portion 38 is preferably approximately 50 to 55 percent of the overall radius of the screw member 22, e.g. 0.65 inches, whereby the depth of the channel 42 is approximately 45 to 50 percent of the overall diameter of the screw member 22, e.g. 0.6 inches. The helix angle of the spiral thread 40 at the intake end of the screw member 22 is preferably approximately eighteen (18) degrees relative to a plane taken diametrically through the screw member 22 and decreases to approximately seven (7) degrees relative thereto at the discharge end of the screw member 22.

Those persons skilled in the art will readily understand that the resultant cross-sectional areas of the channel 42 in the feed, transition and metering sections of the screw members 22 of FIGS. 2 and 3 are respectively fifty to one hundred percent (50–100%) greater than the cross-sectional areas of the channels of screw members in conventional extruder systems. In each of the screw members 22 of FIGS. 2 and 3, the preferred length of the threaded portion thereof may vary according to the thermoplastic material and other aspects of the particular application, but preferably would be between 30 and 50 inches in any event according to the above set forth preferred length to diameter parameters. It will be understood that the above dimensions and dimensional relationships are only exemplary and the dimensional relationships may be different for screw members of significantly larger diameters, the controlling features of the screw construction being the above length to diameter and compression ratios of the screw member. As will be understood and as more fully discussed hereinafter, the particular constructions of the screw members 22 of FIGS. 2 and 3 serve to maximize the rate of material conveyance by the screw member 22 per revolution thereof and to minimize the dissipation of the mechanical rotational energy of the screw member 22 therefrom to the material conveyed.

In each embodiment of the screw member 22, a central axial bore 44 extends entirely through the shank portion 24 and the root portion 38. A conventional longitudinal electrically-operated, resistance-type cartridge heating device 46, such as manufactured by Watlow Electric Company, of St. Louis, Mo., under the model designation FIREROD, is disposed within the bore 44. The cartridge heating device 46 is electrically connected to a pair of slip rings 48 about the periphery of the shank portion 24 of the screw member 22 which are disposed in contact with appropriate electrical brushes or contacts 50 fixed to the frame 12 and connected with a suitable source of electrical current. The screw member 22 is constructed of an appropriate heat conductive metallic material, preferably steel, and, in this manner, the cartridge heating device 46 is adapted for conductive transfer of heat generated by it to the screw member 22 and therefrom by conduction and convection to the material being processed. Four supplementary heating devices 52,54,56,58 of a conventional type are mounted exteriorly about the barrel 18 for heating operation supplementary to the cartridge heater 46.

The screw member 22 is rotatably driven by a driving arrangement indicated generally at 60 in FIG. 1. The driving arrangement includes a pulley wheel 62 affixed to the shank portion 24 of the screw member 27 and belt driven in conventional fashion by an electric drive motor 64 through a series of intermediate pulleys and belts generally indicated at 66. As will be understood, the particular structure of the driving arrangement 60 is not critical to the present invention and substantially any conventional driving arrangement capable of operation within the process parameters of the present invention hereinafter discussed may be employed in the extruder system 10.

The gear pump 16 is of the conventional type generally including an outer body or housing 68 having a pair of counter-rotating intermeshing gears 70 positioned therein which convey the material incoming from the screw conveyor assembly 14 through the spool member 30 and carry it in a positive displacement manner in the cavities defined by the gear teeth around the outer peripheral wall portions bounding the gears 70. The material thusly conveyed by each gear 70 rejoin to form a single material stream into and through the die 32. An example of such a conventional gear pump is manufactured by Maag Gear Wheel Company, Ltd., Zurich, Switzerland, and marketed by Luwa Corporation, of Charlotte, N.C., the assignee hereof, under the model designation CINOX 36/36. Another conventional driving arrangement, representatively shown at 71 in FIG. 1 and including an appropriate driving motor (not shown), is provided for rotatably operating the gear pump 16.

According to the present invention, the driving arrangement 60 for the screw conveyor 14 and the driving arrangement 71 for the gear pump 16 are cooperatively set up to provide a relatively low discharge pressure to the extrudate material within the screw conveyor 14 in relation to the discharge in the material within the gear pump 16 such that the discharge pressure of the screw conveyor 14 is sufficient generally only to fully supply the material cavities of the gears 70 of the gear pump 16. As will be understood, the specific arrangement of the drives for the screw conveyor 14 and the gear pump 16 will depend upon and vary with each particular extruding application as may be affected by differing structures of extruding apparatus and differing extrudate materials. For instance, certain polymeric materials require a greater discharge pressure from the gear pump 16 than other materials. In preliminary experimentation with systems according to the present invention, it has been determined that it is ordinarily desirable for the discharge pressure from the screw conveyor 14 to be within the range of approximately 10 to 25 percent of the discharge pressure from the gear pump 16 so as to bring the discharge pressure from the screw conveyor 14 within a range between a lower limit of approximately 100 to 200 pounds per square inch and an upper limit of between approximately 600 to 700 pounds per square inch, and in accordance with this desired end, the drives of the screw conveyor 14 and the gear pump 16 are arranged to establish compatible speeds of rotation of the screw 22 and the gear pump gears 70 to achieve such relative and absolute pressures.

As a result of this fundamental manner of operation of the present invention, a relatively low degree of mechanical working and heating of the extrudate material is performed within the screw conveyor 14 with a correspondingly low degree of attendant backflow of the extrudate material during its conveyance through the screw conveyor 14. The particular above-described preferred constructions of the screw 22 contribute to the minimizing of mechanical working. As indicated, each preferred embodiment of the screw 22 provides a conveying channel 42 defined by its particular spiral thread 40 which is relatively deep in relation to the diameter of the screw root portion 38 as compared to conventional screws. As a result, each screw 22 effectively provides a relatively higher than conventional output volume of extrudate material per revolution of the screw with a minimal degree of mechanical energy dissipation from the screw 22 to the material whereby a correspondingly minimal degree of mechanically generated heat in the material is created.

In conjunction with the described parameters of the present invention for controlling the relative discharge pressures of the screw conveyor 14 and the gear pump 16 and the described preferred constructions of the screw 22, the cartridge heating device 46 and the barrel heaters 52,54,56,58 are arranged compatibly such that the primary amount of heat energy applied to the extrudate material is supplied by heat transfer from the cartridge heating device 46 to achieve the necessary and desired melting of the extrudate material with the barrel heaters 52,54,56,58 providing only a limited degree of supplemental material heating. The barrel heaters 52,54,56,58 are individually operated to permit selective setting of the operational temperatures of each such heater differently at different locations or zones along the length of the screw conveyor 14 as may be necessary or desirable in the melting operation of the screw conveyor 14.

The following tables summarize the operational conditions of and the data acquired during testing of an extruding system of the type of the present invention, on the one hand, and a conventional gear pump assisted screw extruder system, on the other hand, and demonstrate several notable advantages of extruding systems of the present invention over conventional gear pump assisted screw extruder systems. The various test runs tabulated in the following tables were conducted in a laboratory setting utilizing a screw conveyor having a screw of the type of FIG. 2 of approximately 61.25 inches in total length of its threaded portion and mixing head, with the length of the threaded portion being approximately 55 inches, and a total diameter of approximately 2.5 inches. The barrel of the screw conveyor was of a comparable axial length and a compatible internal diameter of approximately 2.5 inches. The axial bore 44 through the screw was of a diametric dimension of substantially 0.625 inches and carried one aforementioned FIREROD brand cartridge heater 45 inches in length, 0.625 inches in diameter and rated electrically at 9600 watts at 240 volts. The gear pump utilized was an aforementioned conventional model CINOX 36/36 pump marketed by Luwa Corporation, having a gear wheel diameter of 3.6 centimeters. The extrudate material utilized in all runs of the tests was a styrene-butadiene elastomer. The symbols utilized in the following tables represent the following catagories of data: $N_S$ represents the frequency of rotation of the screw expressed in revolutions per minute; $N_p$ represents the frequency of rotation of the gear pump expressed in revolutions per minute; G represents the extrusion rate of the overall system at the discharge location of the gear pump expressed in pounds per hour; $T_*$ represents the temperature of the extruded polymer at the discharge end of the gear pump expressed in degrees Fahrenheit; $P_*$ represents the discharge pressure of the extrudate material at the discharge end of the screw conveyor expressed in pounds per square inch; $q_H$ represents the power supplied to the barrel heaters expressed in kilowatts; $q_S$ represents the power supplied to the cartridge heater expressed in kilowatts; $p_e$ represents the power supplied to the screw conveyor drive arrangement for rotation of the screw expressed in kilowatts; $q_L$ represents the heat loss experienced by the extruding system as a result of radiation, convection and the like, expressed in kilowatts; $G\Delta h$ represents the total energy absorbed by the polymeric material as it is transmitted through the extruding system expressed in kilowatts and provided by the product of the system extrusion rate (G) and the increase in the specific enthalpy of the polymeric material as it proceeds through the system ($\Delta h$) expressed in kilowatt-hours per pound or alternatively provided by the sum of the power supplied to the barrel heaters ($q_L$), the cartridge heater ($q_S$), and the screw conveyor drive ($p_e$), less the heat loss experienced by the system ($q_L$); $p_e/G\Delta h$ represents the fractional amount of the total energy absorbed by the polymer attributable to mechanical working thereof; and E represents the mechanical power economy of the screw conveyor assembly provided by the division of the extrusion rate (G) by the mechanical power supplied to the screw conveyor drive ($p_e$) expressed in pounds per horsepower-hour.

TABLE A

| Run | $N_S$ | $N_P$ | G | $T_*$ | $P_*$ | $q_H$ | $q_S$ | $P_e$ | $q_L$ | $G\Delta h$ | $\dfrac{P_e}{G\Delta h}$ | E(lbs/HPh) |
|---|---|---|---|---|---|---|---|---|---|---|---|---|
| 1 | 25 | 29 | 80  | 360 | 320 | 1.13 | 0    | 2.53 | .50 | 3.16 | .80 | 23.5 |
| 2 | 25 | 39 | 105 | 365 | 400 | 0.62 | 1.90 | 2.03 | .31 | 4.24 | .48 | 38.5 |
| 3 | 25 | 46 | 124 | 376 | 400 | 0.27 | 3.80 | 1.49 | .32 | 5.24 | .28 | 62.0 |
| 4 | 25 | 47 | 126 | 397 | 380 | 0.35 | 5.70 | 0.71 | .99 | 5.77 | .12 | 132.2 |
| 5 | 40 | 73 | 198 | 371 | 250 | —    | 5.70 | 2.46 | —   | 8.19 | .30 | 60.0 |
| 6 | 40 | 63 | 171 | 366 | 400 | —    | 2.90 | 3.58 | —   | 6.93 | .52 | 35.6 |
| 7 | 40 | 48 | 127 | 352 | 200 | 0.91 | 0    | 4.40 | .46 | 4.85 | .91 | 21.5 |

TABLE B

| Run | $N_S$ | G | $T_*$ | $P_*$ | $q_H$ | $P_e$ | $q_L$ | $G\Delta h$ | $\dfrac{P_e}{G\Delta h}$ | E(lbs/HPh) |
|---|---|---|---|---|---|---|---|---|---|---|
| 1 | 25 | 46.0 | 385 | 500  | .65  | 1.82 | .46  | 2.01 | .91  | 18.8 |
| 2 | 50 | 82.5 | 398 | 550  | .57  | 4.65 | 1.42 | 3.80 | 1.22 | 13.2 |
| 3 | 25 | 41.8 | 386 | 1600 | .41  | 2.09 | .63  | 1.87 | 1.12 | 14.9 |
| 4 | 50 | 76.4 | 401 | 1640 | .29  | 4.33 | 1.00 | 3.62 | 1.20 | 13.1 |
| 5 | 50 | 80.4 | 414 | 600  | 1.15 | 3.43 | .66  | 3.91 | .88  | 17.5 |

Figure 4:
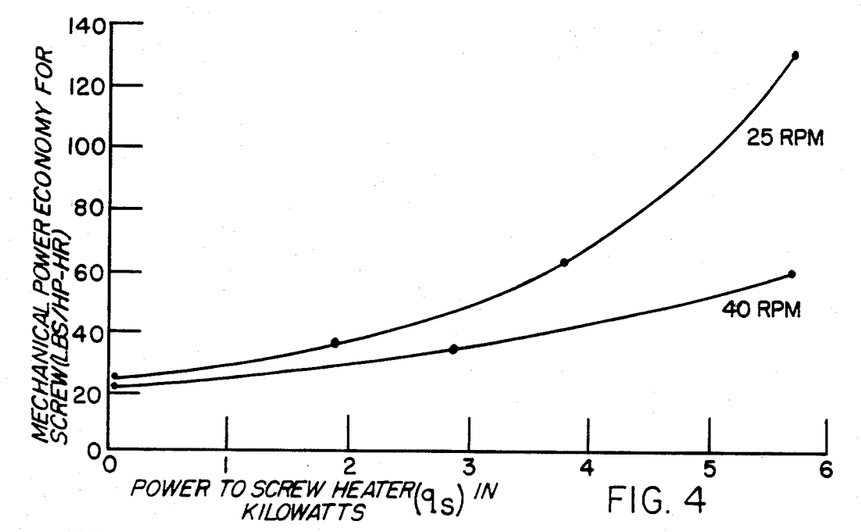
FIG. 4 is a graph showing the relationship under the present invention between the electrical power supplied to the screw heater and the mechanical power economy of the screw.
Figure 5:
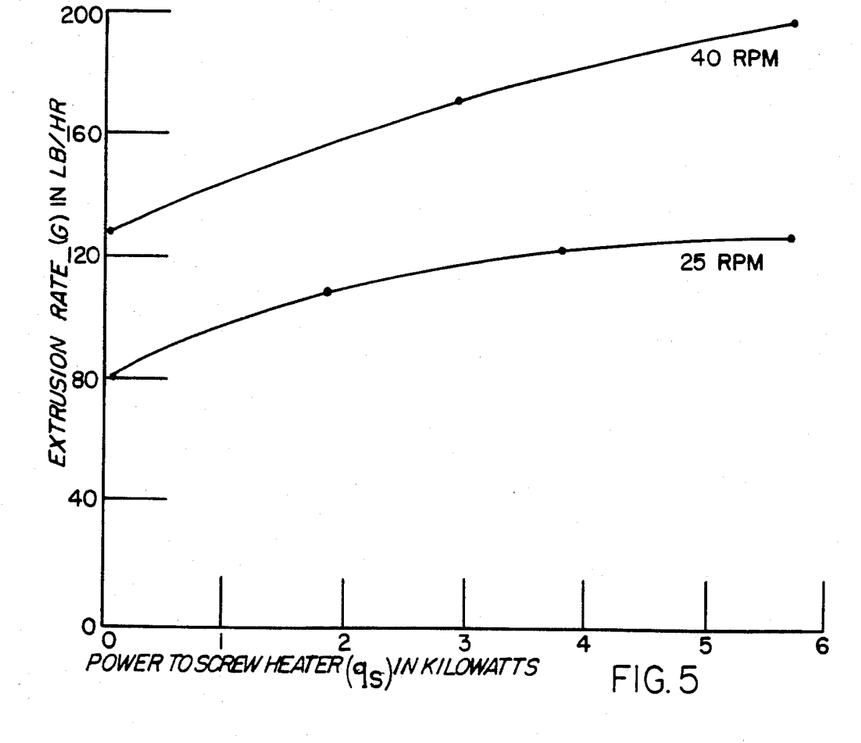
FIG. 5 is another graph showing the relationship under the present invention of the electrical power supplied to the screw heater and the extrusion rate of the system.

As will be recognized from the above set forth data, a comparison of runs 1 through 4 with runs 5 through 7 in Table A performed in a gear pump assisted screw extruder system according to the present invention clearly shows that, at a constant speed of rotation of the screw ($N_s$), increases in the power supplied to the cartridge heater within the screw ($q_S$) permit corresponding increases in the overall extrusion rate (G) of the system while maintaining generally constant the temperature ($T_*$) and the pressure ($P_*$) of the extrudate material within the screw conveyor, resulting in significant, nearly geometric increases in the mechanical power economy (E) of the screw conveyor assembly and a significant reduction of mechanical energy heat generated thereby $p_e/(G\Delta h)$ in the extrudate material. This relationship between the power supplied to the cartridge heater of the screw ($q_S$) and the mechanical power economy of the screw conveyor assembly (E) for the two constant speeds of screw rotation at which the runs tabulated in Table A were conducted is shown in the graph of FIG. 4. Similarly, the relationship between the power supplied to the cartridge heater of the screw ($q_S$) and the overall extrusion rate of the system of the present invention (G) at the two constant speeds of rotation of the screw ($N_s$) of Table A is shown in the graph of FIG. 5. Clearly, in extrusion systems constructed and operated according to the principles of the present invention, a direct relationship is established between the power supplied to the cartridge heater of the screw ($q_S$), on the one hand, and the mechanical power economy of the screw conveyor assembly (E) and in turn of the overall system and the extrusion rate (G) of the overall system, on the other hand.

The data set forth in Table A for a system according to the present invention and the conclusions to be drawn therefrom are to be contrasted with the data tabulated in Table B for tests conducted on the same polymeric material utilizing a comparable conventional screw extruder having conventional barrel heaters without any cartridge or other heater within the screw and without any associated gear pump. The data obtained in the tests of Table B is relatively inconclusive in establishing any relationship between power supplied to the barrel heaters ($q_H$), pressure created within the screw conveyor ($P_*$), extrusion rate of the system (G), and mechanical power economy of the screw conveyor assembly (E) at a constant speed of rotation of the screw. However, most notably, the data of Table B importantly shows in comparison with that of Table A that such conventional extruding systems under generally comparable conditions of screw conveyor operation are substantially entirely incapable of achieving extrusion rates (G) and mechanical power economies (E) on the order of that provided by the present invention.

Tables C, D and E set forth below show further data obtained in testing the same extrusion system under conditions according to the present invention comparable to those of Table A utilizing different polymeric extrudate materials. The symbols utilized in the following tables represent the same data catagories as set forth in above Tables A and B. Table C sets forth data obtained from five extrusion runs of an acrylic material. The Table D sets forth data obtained during three extrusion runs of polypropelene. Table E sets forth data obtained during four extrusion runs of high density polyethylene.

TABLE C

| Run | $N_s$ | $N_p$ | G | $T^*$ | $q_S$ | $P_e$ | E(lbs/HPhr) |
|---|---|---|---|---|---|---|---|
| 1 | 24 | 46 | 137 | 485 | 2.5 | 4.4 | 23.2 |
| 2 | 24 | 54 | 159 | 505 | 5.0 | 3.5 | 33.8 |
| 3 | 12.5 | 30 | 97 | 492 | 5.0 | 1.9 | 38.8 |
| 4 | 20.5 | 48 | 141 | 476 | 5.0 | 4.0 | 26.1 |

TABLE D

| Run | $N_s$ | $N_p$ | G | $T^*$ | $q_S$ | $P_e$ | E(lbs/HPhr) |
|---|---|---|---|---|---|---|---|
| 1 | 27.5 | 20 | 46.4 | 446 | 0 | 3.0 | 11.6 |
| 2 | 27.5 | 43 | 92.1 | 444 | 5.0 | 3.8 | 18.1 |
| 3 | 50 | 72 | 144 | 471 | 5.0 | 5.6 | 19.2 |

TABLE E

| Run | $N_s$ | $N_p$ | G | $T^*$ | $q_S$ | $P_e$ | E(lbs/HPhr) |
|---|---|---|---|---|---|---|---|
| 1 | 33.5 | 33 | 75.9 | 406 | 0 | 3.4 | 16.5 |
| 2 | 33.5 | 44 | 100 | 426 | 3.8 | 3.6 | 20.8 |
| 3 | 50.2 | 71 | 152 | 411 | 5.0 | 6.1 | 18.5 |

The data of Tables C, D and E indicate further important advantages of the present invention. First, the present invention provides results and advantages for a range of different polymeric materials in each case comparable to the results and advantages demonstrated by the runs of Table A and discussed above. A comparison of runs 1 and 2 of Table C with the acrylic material indicates that, at a constant speed of rotation of the screw ($N_s$), an increase in the gear pump extrusion rate (G) together with a simultaneous increase in the level of power supplied to the cartridge heater ($q_S$) resulted in a decrease in the mechanical power input to the screw drive ($p_e$) and an increase in the mechanical power economy (E) of the screw conveyor. Similarly, a comparison of runs 1 and 2 of Table D with the polypropylene and a comparison of runs 1 and 2 of Table E with the high density polyethylene indicate that, at constant speeds of rotation of the screw ($N_s$), an increase in the gear pump extrusion rate (G) together with an increase in the level of power supplied to the cartridge heater ($q_S$) resulted in an increase in the mechanical power economy (E) of the screw conveyor. More fundamentally, the data of Tables C, D and E indicate that the apparatus of the present invention is susceptible and capable of efficient use without structural charge for extruding a relatively wide variety of differing polymeric materials, this being in contrast to conventional extruding systems wherein it is ordinarily required that a particular different screw be employed with each different class of polymeric material.

Thus, in essence, the present invention substantially separates the functions of melting the thermoplastic material and pressurizing it, both conventionally performed in and by the screw extruder, by substantially reducing pressurization and mechanical heat generation in the screw extruder so as to utilize it essentially only for performing material melting by heat transfer and utilizing the gear pump essentially only for material pressurization. As a direct result, the screw extruder becomes capable of greater output rates per revolution of the screw and, therefore, for any given extrusion rate, a lower rotational speed of the screw may be employed which further reduces mechanical heat generation. In this manner, improved control over the level of the extrudate temperature is possible so that overheating of the extrudate may be avoided and cooling thereof is not necessary. Furthermore, the performance of material heating from internally of the screw serves to minimize heat losses. Thus, as an ultimate net effect, the power economy and energy efficiency of the extruder system are increased over that of conventional extruder systems. Accordingly, the present invention essentially removes within practical parameters upper limitations on achievable extrusion output rates and mechanical power economies imposed by conventional high pressure, externally heated extruding systems. It therefore now is possible to achieve higher extrusion output rates and mechanial power economies of magnitudes heretofore not achieved.

Figure 6:
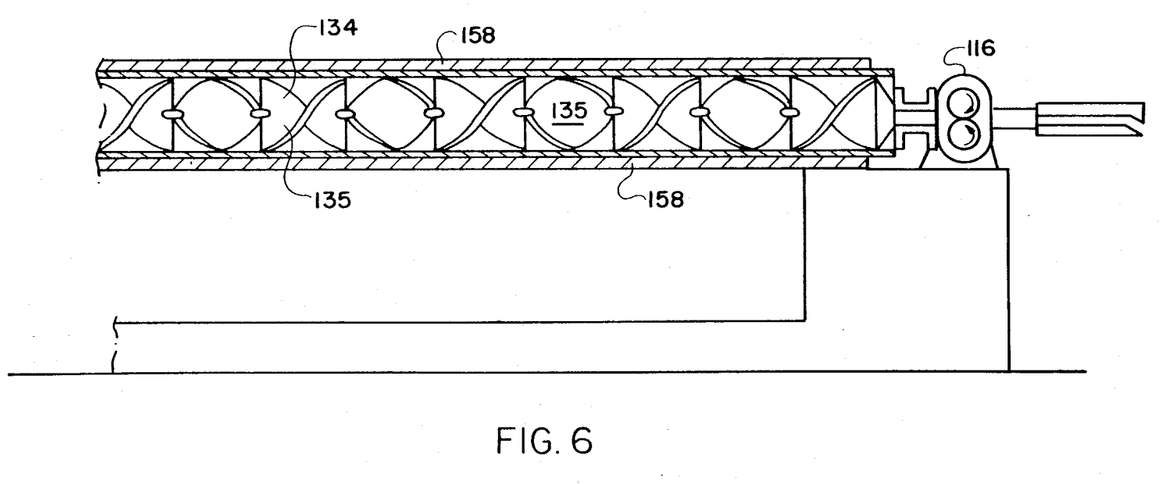
FIG. 6 is a schematic vertical sectional view of a combined system of a screw extruder, motionless mixing device and gear pump according to the preferred embodiment of the present invention.

FIG. 6 illustrates schematically a second embodiment of an extruder system according to the present invention, indicated generally at 110. The extruder system 110 basically includes a longitudinal screw conveyor assembly 114 and a gear pump 116 of substantially the same construction and operation as in the embodiment of FIG. 1 except that the threaded screw member 122 of the screw conveyor assembly 114 is of a reduced length and is not provided with any mixing head comparable to the mixing head 34 of the apparatus of FIG. 1. Instead of a mixing head, the extruder system 110 provides a motionless mixing device 134 fixed stationarily within the discharge end of the barrel 118 of the screw conveyor assembly 114. Motionless mixing devices such as the device 134 are conventional and well known in the art and need not be described in detail herein. Representative examples of conventional motionless mixing devices are disclosed in U.S. Pat. Nos. 3,286,992; 3,953,002; and 4,408,893. Preferably, the motionless mixing device 134 is of the type manufactured and sold by Luwa Corporation, Charlotte, N.C., under the model designation BLENDREX. Basically, the motionless mixing device 134 includes a plurality a helical baffle elements 135 arranged and connected in coaxial end-to-end relation with the adjacent edges of adjacent baffle member 135 arranged to extend generally perpendicularly to one another. It is preferred that the motionless mixing device 134 have ten to twelve or more helical baffle elements 135. Thus, in conventional manner, the motionless mixing device 134 is operative to repetitively divide and recombine the flow of melted thermoplastic material discharging from the channel 142 of the screw 122 to effect a laminar flow mixing or blending of the melted material, thereby to homogenize the material and significantly reduce temperature gradients therein. The improved homogenization of the melted thermoplastic material provided by the mixing device 134 further serves to eliminate any need for backflow of the thermoplastic material in the channel 142 of the screw 122, thereby additionally aiding in the elimination of mechanical heat generation in the thermoplastic material. Additionally, the motionless mixing device 134 requires and consumes no energy for its operation, except for the necessary power to drive the screw 122 sufficiently to convey the material through the mixer 134, and therefore contributes to the enhancement of the power economy and energy efficiency of the extruder system 110. As will be appreciated, the homogenization of the melted thermoplastic material serves to significantly improve the extrudate quality in terms of its temperature uniformity, resultingly improving the quality of end products extruded therewith. In this embodiment, it is also preferred that the supplementary barrel heaters 152,154,156,158 be employed with the barrel heater 158 disposed about the portion of the barrel 118 containing the motionless mixing device 134. In this manner, the barrel heater 158 may be employed as desired for supplementarily heating the material discharged from the screw 122 to melt any unmelted material and to elevate the temperature level of the material to that most desirable and preferred for extrusion or other working subsequent to discharge from the gear pump 116. Thus, it is ideally preferred in this embodiment of the present apparatus and process that the screw extruder 122 serve to melt most or all of the thermoplastic material with the motionless mixing process and region of the present apparatus serving the overall purpose of finally conditioning the temperature level of the melted material.

Figure 7A:
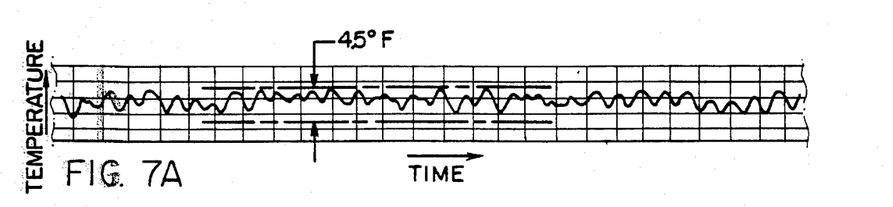
FIGS. 7A and 7B and FIGS. 8A and 8B are charts comparatively showing recorded fluctuations in extrudate temperature entering and exiting a motionless mixing device according to the present invention.
Figure 7B:
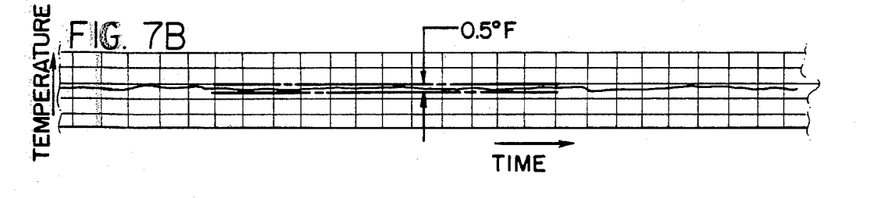
Figure 8A:
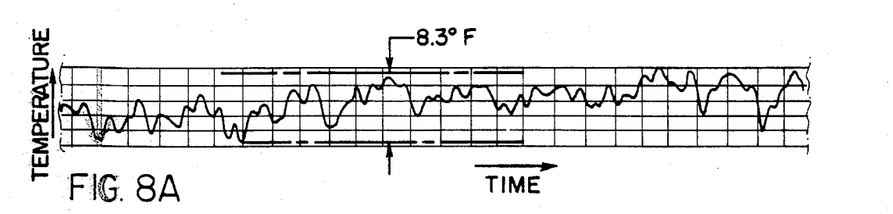
Figure 8B:
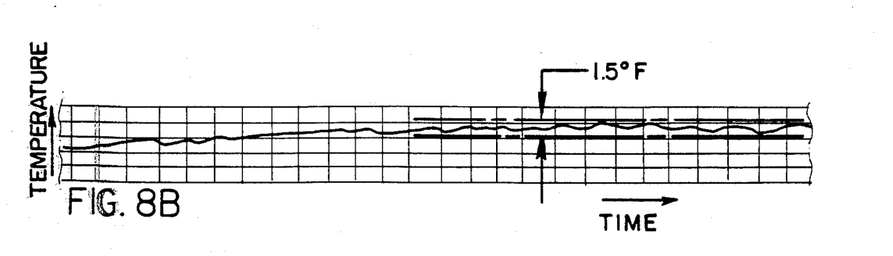

The foregoing discussed advantages provided by the use of a motionless mixing device 134 are demonstrated by the charts of FIGS. 7A and 7B and FIGS. 8A and 8B. Such figures show charts recorded during test runs passing a melted thermoplastic material through a conventional BLENDREX motionless mixing device of Luwa Corporation and respectively show the recorded temperature fluctuations over time in the thermoplastic material at the entrance and exit ends of the motionless mixing device over the course of the test runs. The motionless mixing device utilized included 12 helical baffle elements of a uniform diameter of 1.57 inches and a total length of 31 inches. The thermoplastic material utilized in the test runs was a linear low density polyethylene having a melt index of 1.0. FIGS. 7A and 7B were recorded during a test run at a relatively low flow rate of 89 pounds of the thermoplastic material per hour and at a relatively low pressure differential across the motionless mixer of 410 pounds per square inch. FIG. 7A shows that fluctuations of a magnitude of approximately 4.5 degrees Fahrenheit occurred over time in the thermoplastic material entering the motionless mixing device, while FIG. 7B illustrates that the temperature fluctuations of such material were reduced to less than 1 degree Fahrenheit at the discharge end of the device with the average exit temperature of the material being 415 degrees Fahrenheit. Comparably, FIGS. 8A and 8B illustrate a test run of the same thermoplastic material through the same motionless mixing device at a relatively high flow rate of 172 pounds per hour and at a relatively high pressure differential across the motionless mixer of 700 pounds per square inch. FIG. 8A shows that temperature fluctuations of more than 8 degrees Fahrenheit occurred in the thermoplastic material entering the motionless mixing device, while FIG. 8B shows that the temperature variations in such material were reduced to approximately 1.5 degrees Fahrenheit at the discharge end of the motionless mixing device with the average exit temperature of the material being 429 degrees Fahrenheit.

Figure 9:
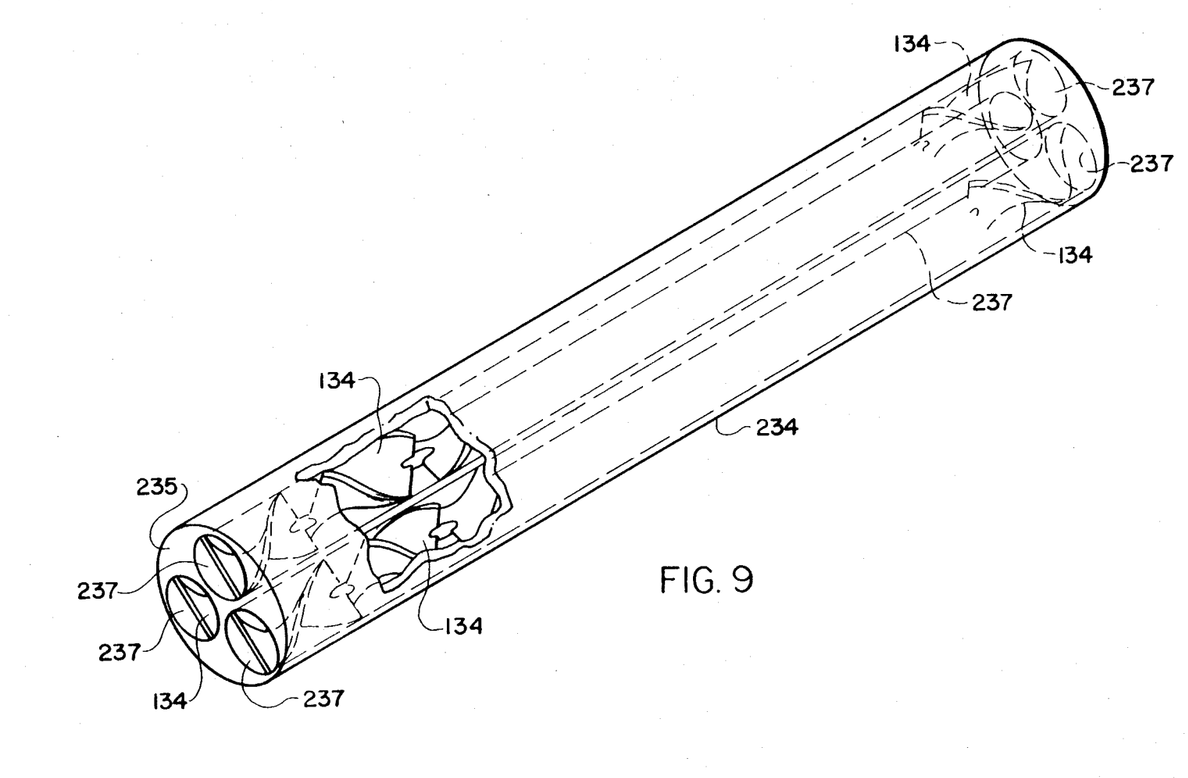
FIG. 9 is a perspective view partially broken away a modified motionless mixing apparatus for use in a combined extruder system according to the present invention.

FIG. 9 illustrates a motionless mixing apparatus 234 designed particularly to be fitted in the discharge end of a screw conveyor in an extruding system according to the present invention. The motionless mixing apparatus 234 includes a cylindrical body or plug 235 to be snugly fitted in the screw conveyor barrel (not shown) and has a plurality of bores 237, preferably three, formed axially therethrough in each of which extends stationarily a motionless mixing device 134. The plural motionless mixing devices 134 of the apparatus 234 are expected to further enhance the homogeniety of the melted extrudate material to better achieve the above-discussed advantages.

It is contemplated alternatively that a motionless mixing device or apparatus, such as the device 134 or apparatus 234, may be arranged downstream of the gear pump 16,116 intermediate it and the following die 32,132 or other subsequent material working station, rather than intermediate the screw conveyor assembly 14,114 and the gear pump 16,116. The latter embodiment such as is illustrated in FIG. 6 has the advantage of facilitating the retrofitting of the present invention in a conventional combined screw conveyor and gear pump extruding system in that the motionless mixing device or apparatus 134,234 may be constructed to be readily inserted slidably into the barrel of the screw conveyor or assembly. On the other hand, the disposition of the motionless mixing device or apparatus following the gear pump 16,116 has the advantage of relieving the screw member 22,122 of the necessity of generating the needed pressure in the material to cause it to flow through the mixing device or apparatus 134,234 to the gear pump 16,116, and instead utilizes the gear pump 16,116 for such purpose. This embodiment is considered best adapted to the original design and construction of new equipment as opposed to retrofitting existing equipment.

The present invention has been described in detail above for purposes of illustration only and is not intended to be limited by this description or otherwise to exclude any variation or equivalent arrangement that would be apparent from, or reasonably suggested by the foregoing disclosure to the skill of the art.

I claim:

1. In a method of extruding thermoplastic material comprising passing said material successively through an extruder having rotating conveying screw means and a rotary gear pump, the improvement comprising operating said extruder and said pump at selected compatible speeds respectively to convey said thermoplastic material through said extruder with relatively little material pressurization in said extruder at said gear pump for relatively little heat generating mechanical working thereof while heating said material by conduction from said screw means to melt said material in said extruder primarily by heat transfer and to convey said melted material by said gear pump under pressure to a subsequent working station, whereby said material is extruded at a substantially greater rate and with substantially increased power economy and energy efficiency than without said selected operating or said heating from said screw means.

2. The improvement in a method of extruding thermoplastic material according to claim 1 and characterized further in that said heating from said screw means includes applying heat from internally of said screw means through said screw means to said material.

3. The improvement in a method of extruding thermoplastic material according to claim 2 and characterized further in that said selected operating and heating from said screw means includes conveying said material in said extruder with relatively little backflow of said material.

4. The improvement in a method of extruding thermoplastic material according to claim 3 and characterized further by applying heat to said material from exteriorly of said extruder, said heating from said screw means predominately heating said material and said exteriorly applying heat only secondarily and supplementally heating said material.

5. The improvement in a method of extruding thermoplastic material according to claim 4 and characterized further by blending said melted material following said heating from said screw means and in advance of said working station to homogenize said melted material for reducing temperature gradients therein.

6. The improvement in a method of extruding thermoplastic material according to claim 5 and characterized further in that said blending comprises passing said melted material through a motionless mixing device.

7. The improvement in a method of extruding thermoplastic material according to claim 6 and characterized further by supplementarily heating said melted material in said motionless mixing device for conditioning said melted material at a predetermined temperature level for working at said subsequent working station.

8. The improvement in a method of extruding thermoplastic material according to claim 1 and characterized further in that said selected operating and heating from said screw means includes conveying said material in said extruder with relatively little backflow of said material.

9. The improvement in a method of extruding thermoplastic material according to claim 1 and characterized further by applying heat to said material from exteriorly of said extruder, said heating from said screw means predominately heating said material and said exteriorly applying heat only secondarily and supplementally heating said material.

10. The improvement in a method of extruding thermoplastic material according to claim 1 and characterized further by blending said melted material following said heating from said screw means and in advance of said working station to homogenize said melted material for reducing temperature gradients therein.

11. The improvement in a method of extruding thermoplastic material according to claim 10 and characterized further in that said blending comprises passing said melted material through a motionless mixing device.

12. In an apparatus for extruding thermoplastic material comprising an extruder having rotating conveying screw means in combination with a rotary gear pump, the improvement comprising heating means disposed interiorly within said screw means for heating said material by conduction therefrom and operating means compatibly arranging said screw means and said gear pump for rotating at selected relative speeds for conveying said material through said extruder with relatively little material pressurization in said extruder at said gear pump for relatively little heat generating mechanical working thereof thereby to melt said material in said extruder primarily by heat transfer from said heating means and for conveying said melted material by said gear pump under pressure to a subsequent work station, whereby said material is extruded at a substantially greater rate and with substantially increased power economy and energy efficiency than without said heating means or said operating means.

13. The improvement in an apparatus for extruding thermoplastic material according to claim 12 and characterized further in that said heating means includes an electrically-operated cartridge heater extending longitudinally within said screw means for applying heat through said screw means to said material.

14. The improvement in an apparatus for extruding thermoplastic material according to claim 12 and characterized further in that said screw means is of a relatively low length to diameter ratio and of a relatively small compression ratio.

15. The improvement in an apparatus for extruding thermoplastic material according to claim 14 and characterized further in that the length to diameter ratio of said screw means is in the range of approximately 12:1 to 20:1 and the compression ratio of said screw means is in the range of approximately 1:1 to 2:1.

16. The improvement in an apparatus for extruding thermoplastic material according to claim 15 and characterized further in that said screw means includes a spiral screw flight extending longitudinally of said screw means and being of a decreasing radially outward dimension along the length of said screw means in the direction of material conveyance forming a material conveying spiral channel relatively deep with respect to the overall diametric dimension of said screw means for maximized extrusion output per revolution of said screw means and minimized dissipation of the mechanical energy generated by said screw means.

17. The improvement in an apparatus for extruding thermoplastic material according to claim 16 and characterized further in that said flight is of a dimension in the range of approximately forty to fifty percent (40%–50%) of the overall radial dimension of said screw means at the inlet end of said extruder and in the range of approximately fifteen to twenty percent (15%–20%) of said overall radial dimension at the extrusion end of said extruder.

18. The improvement in an apparatus for extruding thermoplastic material according to claim 15 and characterized further in that said screw means includes a spiral screw flight extending longitudinally of said screw means of a constant radially outward dimension and a decreasing spiral helix angle along the length of said screw means in the direction of material conveyance forming a material conveying channel relatively deep with respect to the overall diametric dimension of said screw means for maximized extrusion output per revolution of said screw means and minimized dissipation of the mechanical energy generated by said screw means.

19. The improvement in an apparatus for extruding thermoplastic material according to claim 12 and characterized further by secondary heating means for applying heat to said material from exteriorly of said extruder, said first-mentioned heating means and said secondary heating means being co-operatively arranged for supplying said thermal heating of said material predominately by said first-mentioned heating means and only secondarily and supplementally by said secondary heating means.

20. The improvement in an apparatus for extruding thermoplastic material according to claim 12 and characterized further by blending means disposed intermediate said screw means and said work station for homogenizing said melted material for reducing temperature gradients therein.

21. The improvement in an apparatus for extruding thermoplastic material according to claim 20 and characterized further by supplemental heating means associated with said blending means for supplementarily heating said melted material to a predetermined temperature level for working at said subsequent work station.

22. The improvement in an apparatus for extruding thermoplastic material according to claim 20 and characterized further in that said blending means comprises a motionless mixing device.

23. The improvement in an apparatus for extruding thermoplastic material according to claim 22 and characterized further in that said heating means includes an electrically-operated cartridge heater extending longitudinally within said screw means.

24. The improvement in an apparatus for extruding thermoplastic material according to claim 20 and characterized further in that said blending means comprises motionless mixing means including plural parallel motionless mixing devices.

* * * * *

UNITED STATES PATENT OFFICE
CERTIFICATE OF CORRECTION

Patent No. 4,501,498  Dated February 26, 1985

Inventor(s) James M. McKelvey

It is certified that error appears in the above-identified patent and that said Letters Patent are hereby corrected as shown below:

Column 1, Line 24, delete "as" and insert therefor — has — .
Column 1, Line 37, delete "friction" and insert therefor — frictional — .
Column 1, Line 60, delete "areas" and insert therefor — area —.
Column 4, Line 29, after "away" insert -- of -- .
Column 7, Line 25, delete "27" and insert therefor — 22 — .
Column 7, Line 59, after "discharge" insert -- pressure -- .
Column 12, Line 1, delete "charge" and insert therefor -- change -- .
Column 12, Line 59, delete "a" and insert therefor — of — .

Signed and Sealed this

Eleventh Day of March 1986

[SEAL]

Attest:

DONALD J. QUIGG

Attesting Officer  Commissioner of Patents and Trademarks